United States Patent
Dasu et al.

(10) Patent No.: US 11,774,414 B2
(45) Date of Patent: Oct. 3, 2023

(54) TOTAL ORGANOFLUORINE METHOD FOR PFAS USING REDUCTIVE DEFLUORINATION

(71) Applicant: Battelle Memorial Institute, Columbus, OH (US)

(72) Inventors: Kavitha Dasu, Powell, OH (US); Chad Cucksey, Columbus, OH (US); Franco Pala, Rockland, MA (US)

(73) Assignee: Battelle Memorial Institute, Columbus, OH (US)

( * ) Notice: Subject to any disclaimer, the term of this patent is extended or adjusted under 35 U.S.C. 154(b) by 172 days.

(21) Appl. No.: 17/493,849

(22) Filed: Oct. 5, 2021

(65) Prior Publication Data
US 2022/0107291 A1    Apr. 7, 2022

Related U.S. Application Data (60) Provisional application No. 63/087,688, filed on Oct. 5, 2020.

(51) Int. Cl.
  *G01N 30/12*  (2006.01)
  *G01N 30/06*  (2006.01)

(52) U.S. Cl.
  CPC ....... *G01N 30/12* (2013.01); *G01N 2030/062* (2013.01); *G01N 2030/126* (2013.01)

(58) Field of Classification Search
  CPC ....... G01N 2030/062; G01N 2030/126; G01N 30/06; G01N 2030/8845; B01D 15/12; B01D 15/361
  See application file for complete search history.

(56) References Cited

PUBLICATIONS

Backe, Will J., Thomas C. Day, and Jennifer A. Field. "Zwitterionic, cationic, and anionic fluorinated chemicals in aqueous film forming foam formulations and groundwater from US military bases by nonaqueous large-volume injection HPLC-MS/MS." Environmental science & technology 47.10 (2013): 5226-5234 (Year: 2013).*

Houtz, E. E, & Sedlak, D. L. "Oxidative conversion as a means of detecting precursors to perfluoroalkyl acids in urban runoff", Environ Sci Technol, (2012) 46(17), 9342-9349.

Kissa, E. (2001). Fluorinated Surfactants and Repellents, 2nd ed.; Marcel Dekker, Inc: New York.

(Continued)

*Primary Examiner* — Jennifer Wecker
*Assistant Examiner* — Michael Paul Shimek
(74) *Attorney, Agent, or Firm* — Frank Rosenberg; Susanne A. Wilson (57) ABSTRACT

A method of determining total organofluorine in a sample comprising PFAS, comprising: providing a solution of PFAS in an organic solvent to obtain extracted PFAS, or extracting a sample with an organic solvent to obtain extracted PFAS; treating the extracted PFAS with a sodium metal dispersion and alcohol to obtain sodium fluoride; and quantifying the amount of the fluoride. Surprisingly, we discovered that the method recovered substantial fluorine from PFAS and significantly higher yields obtained by selection of the appropriate alcohols. The method is selective for organofluorine from inorganic fluorine.

20 Claims, 2 Drawing Sheets

(56) References Cited

PUBLICATIONS

Miyake, Y. et al. "Trace analysis of total fluorine in human blood using combustion ion chromatography for fluorine: a mass balance approach for the determination of known and unknown organofluorine", Journal of Chromatography A, 1154 (2007) 214-221.

Peaslee. G. F. et al., "Another Pathway for Firefighter Exposure to Per- and Polyfluoroalkyl Substances: Firefighter Textiles. Environmental Science & Technology Letters.", Environ. Sci. Technol. Lett. (2020), 7, 8, 594-599.

Ritter, E. E., et al. "PIGE as a screening tool for Per- and polyfluorirrated substances in papers and textiles.", Nuclear Instruments and Methods in Physics Research Section B: Beam Interactions with Materials and Atoms, 407 (2017) 47-54.

Ross, Ian et al., "A review of emerging technologies for remediation of PFASs", Remediation. (2018) 28, 101-126.

Schaider, L. A., et al. "Fluorinated Compounds in U.S. Fast Food Packaging ", Environmental Science & Technology Letters (2017), 4, 3, 105-111.

Venkateswarlu, P. "Sodium Biphenyl Method for Determination of Covalently Bound Fluorine in Organic Compounds and Biological Materials." Anal. Chem. (1982) 54. 1132-1137.

Wagner, A. et al. Determination of adsorbable organic fluorine from aqueous environmental samples by adsorption to polystyrene-divinylbenzene based activated carbon and combustion ion chromatography. Journal of Chromatography A, (2013) 1295, 82-89.

Ware, M. L. et al., "Potentiometric Determination of Halogen Content in Organic Compounds Using Dispersed Sodium Reduction." Anal. Chem. (I988) 60, 383-384.

Yeung, L. W., et al. "Perfluormated compounds and total and extractable organic fluorine in human blood Samples from China". Environ. Sci. Technology (2008) 42 (21), 8140-8145.

\* cited by examiner

TOTAL ORGANOFLUORINE METHOD FOR PFAS USING REDUCTIVE DEFLUORINATION

RELATED APPLICATION

This application claims priority to U.S. Provisional Patent Application Ser. No. 63/087,688, filed 5 Oct. 2021.

BACKGROUND

Per- and polyfluoroalkyl substances (PFAS) are widely used for many commercial and industrial applications. Most PFAS-containing products use a proprietary, technical grade mixture of PFAS designed to impart specific performance-based characteristics to the products (e.g., heat resistance, surfactant properties). PFAS ground water and soil contamination at aqueous film forming foams (AFFF) impacted sites often cover large areas, and may include multiple source areas. There are more than 4700 PFAS chemicals in the global market, the known quantifiable PFAS account for a very small fraction and only a limited number of analytes can be quantified using the known analytical procedures. There is a need for a method which can be used to quantify the total fluorine present in the environmental samples.

To overcome some of the limitations of directly analyzing individual PFAS, several alternative methods of quantifying a total PFAS concentration through an indirect method have arisen. First, a total organofluorine (TOF) method was used to quantify total extractable organic fluorine in blood and water (Miyake et al. 2007, Yeung et al. 2008) using combustion ion chromatography (CIC). This technique requires the isolation of adsorbable organofluorine materials (AOF) onto an activated carbon or other type of sorbent, and upon combustion of the sorbent, the fluorine released is measured as fluoride on an ion chromatograph. AOF-CIC is not specific to PFASs and has been used to measure pharmaceuticals and other compounds that contain fluorine (Wagner et al. 2013). Another limitation might be IC is prone to matrix interference for fluoride, which might result in overestimation of total PFAS.

Next, Houtz & Sedlak developed the total oxidizable precursor assay (TOP Assay), which oxidizes polyfluoroalkyl compounds to perfluoroalkyl carboxylates (Houtz & Sedlak 2012). In samples in which complete oxidation of polyfluoroalkyl compounds/perfluoroalkyl acid (PFAA) precursor compounds is achieved, the transformation of precursors to PFAAs is equivalent to a conservative estimate of the total concentration of PFAA precursors in the sample. To differentiate between PFCAs initially present in the sample and those evolved from precursors, the sample must be measured for PFAAs both before and after oxidation, making it somewhat more expensive than a technique such as AOF-CIC. Other limitations include (a) as not all the precursors might be oxidizable, and hence results in underestimation of total PFAS, (b) matrix interferences.

Most recently, the particle induced gamma emission (PIGE) ray technique of measuring atomic fluorine was applied to PFAS (Ritter et al. 2017; Peaslee et al. 2020). Like AOF-CIC, it measures a total organofluorine concentration that is not specific to PFAS. It has the potential advantage of being easily applied to complex fluoropolymer matrices, which is more challenging to achieve with AOF-CIC and not achievable with TOP Assay. PIGE requires a very large piece of specialized equipment that requires a dedicated room or building and is not commonly available in a commercial context. Currently, the only entity offering PIGE is a university-private partnership at University of Notre Dame.

INTRODUCTION

In the literature reports, though the potentiometric determination of halogen content in neat organic compounds has been applied successfully using the dispersed sodium reduction method (Ware et al. 1988), determination of fluoride content in Per- and Polyfluoroalkyl Substances (PFAS) using this method presents several obstacles. PFAS are expected to be more chemically inert than the compounds explored by Ware, and their water solubility will hinder the principal mechanism of sodium reduction. Venkateswarlu (1982), applied the sodium biphenyl reduction method followed by potentiometric determination of fluoride in aqueous and biological matrices (Venkateswarlu 1982).

Ross et al. in "A review of emerging technologies for remediation of PFASs," Remediation, 2018, 28:101-126 describe why fluorinated compounds are expected to have very different chemistries than other halogenated molecules: The C—F bond is the strongest bond known due to the strong dipole induced by the highly electronegative fluorine atom. The bond strength of C—H in methane is 101 kcal/mol, with the substitution of one hydrogen atom on methane ($CH_4$) with fluorine atom increases the C—F bond strength in $H_3C$—F to 107 kcal/mol, and by completely substituting all the hydrogen atoms on $CH_4$ with fluorine atoms ($CF_4$), increases the bond strength to 116 kcal/mol. Hence, as the degree of fluorination increases on the carbon atom, the C—F bond length decreases, and hence bond strength increases (Kissa, 2001). Further, the optimal overlap between the 2s and 2p orbitals of both carbon and fluorine atoms and the shielding of the three lone pair of electrons on each fluorine atom provides a net negative partial charge resulting in an electrostatic and steric shielding effect against any nucleophilic attack on the central carbon. Similarly, comparing the C—F bond strength with other halogens, $H_3C$—F bond (bond strength 107 kcal/mol) is strongest compared to other carbon-halogens bonds ($H_3C$—Cl :78 kcal/mol; $H_3C$—Br: 67 kcal/mol, and $H_3C$—I: 57 kcal/mol) as the size of the halogen increases (F<Cl<Br<I), the bond strength decreases (Kissa, 2001). Perfluorinated chemicals with multiple fluorine substituted carbons linked together provides high stability against any chemical and microbial attacks.

In view of these factors, techniques for quantifying Cl and Br would not be expected to be applicable or accurate for determination of F in PFAS.

SUMMARY OF THE INVENTION

Figure 1:
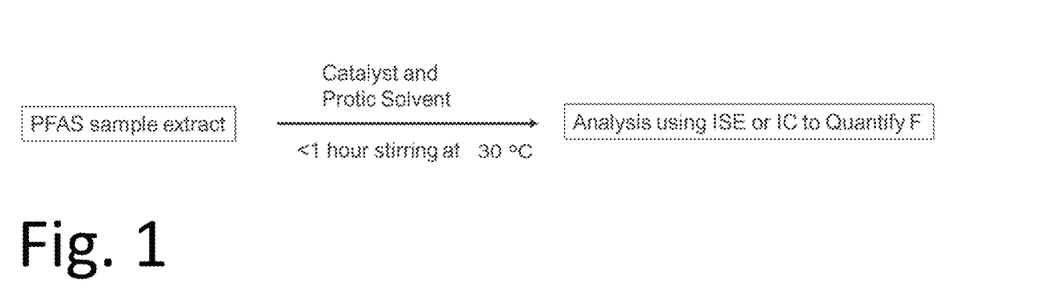
FIG. 1 shows a flow diagram for the reductive total organofluorine method.

A rapid potentiometric method has developed to measure the free fluoride generated by the quick reductive defluorination of PFAS in the environmental samples (FIG. 1). Hereafter, the method may be referred as reductive total organofluorine method (RTOF). Different quantitative methods were tested to quantify the free fluoride formed.

The invention provides a method of determining total organofluorine in a sample comprising PFAS, comprising: extracting a sample with an organic solvent (or otherwise providing a sample of PFAS in an organic solvent) to obtain extracted PFAS; treating the extracted PFAS with sodium metal and alcohol to obtain sodium fluoride; and quantifying the amount of the fluoride.

The inventive method can be further characterized by one or any combination of the following characteristics: wherein the organic solvent comprises at least 50 mass % ether; wherein the organic solvent comprises at least 50 mass % diethyl ether; wherein the sodium metal is in the form of a sodium dispersion; wherein the step of quantifying is conducted using an ion selective electrode; wherein the extracted PFAS is contacted with the sodium dispersion for a time between 8 and 25 minutes, or between 8 and 22 minutes, or between 10 and 20 minutes; wherein the extracted PFAS is contacted with the sodium dispersion at a temperature of at least 25° C. or at least 30° C., or in the range of 30 to 36° C.; wherein the extracted PFAS is contacted with the sodium dispersion prior to treating with an alcohol and wherein the alcohol comprises ethanol or a higher alcohol; wherein the alcohol comprises propanol and/or butanol; wherein the alcohol comprises 2-propanol and/or 2-butanol; wherein the alcohol comprises 2-propanol; wherein the alcohol comprises at least 50 mass % 2-propanol; wherein the fluoride recovery from the organofluorine in the sample is at least 50%; comprising alternating treatments with methanol and a higher alcohol; treatment with a mixture of methanol and 2-propanol, wherein the molar ratio of 2-propanol/methanol is at least 0.3, or at least 0.4, or at least 0.5, or in the range of 0.3 to 0.7; wherein the step of contacting with sodium is conducted for a time between 1 and 20 minutes, or between 1 and 15 minutes, or between 3 and 15 minutes; wherein the step of quantifying is conducted using an ion chromatography; wherein the PFAS is AFFF; wherein the PFAS is AFFF and wherein the method comprises adding sufficient sodium until foaming stops, and then adding additional sodium.

The invention can be further described by any of the features and details described herein. For example, the invention can be further characterized by any of the results described herein or within ±10% or within ±20% or within ±30% any of the results described herein.

EXPERIMENTAL SECTION

Materials:

TABLE 1

| Description | Vendor | Part Number |
| --- | --- | --- |
| Anhydrous diethyl ether | Fisher Scientific | E198-4 |
| Anhydrous methanol, DriSolv | EMD Millipore | MX0472-6 |
| 2-propanol, Optima LC-MS grade | Fisher Scientific | A461-4 |
| Molecular sieve deperox/dehydrate | Fluka | 69805 |
| Sodium, dispersion, 40% in oil | Alfa Aesar | 10340 |
| Methyl orange indicator solution, 0.1% (w/v) | Fisher Scientific | SM54-500 |
| Nitric acid, 70%, Trace metal grade | Fisher Scientific | A509-P212 |

TABLE 1-continued

| Description | Vendor | Part Number |
| --- | --- | --- |
| Total ionic strength adjustment buffer, TISAB II | Orion | 940909 |
| Fluoride standard, 1000 mg/L | Sigma Aldrich | 77365 |
| Fluoride ion selective electrode filling solution | Orion | 900061 |
| Fluoride ion selective electrode | Thermo | 9609BNWP |

Literature Conditions

An experiment closely followed the literature parameters used to determine bromine and chlorine content in organic compounds using sodium reduction (Ware, Argentine et al. 1988). Here, 13.5 mg of PFOA was added to a 120-mL glass beaker. Fifty milliliters of diethyl ether was added to the beaker and the PFOA allowed to completely dissolve. The reaction beaker was placed within a jacketed beaker controlled at a temperature of 22° C. The solution was allowed to stir for 5 minutes. Two milliliters of the 40% sodium dispersion was added to the beaker. Thirty drops of dry methanol was immediately added and the solution was stirred for five minutes. Fifteen milliliters of isopropyl alcohol was added to the beaker followed by 25 milliliters of high purity deionized water (quenching the reaction). Five drops of methyl orange indicator was added followed by a sufficient amount of concentrated nitric acid to reach the indicator endpoint (orange to pink). The solution was allowed to separate. The volume of the aqueous phase was measured to be 44 mL. An aliquot of the aqueous phase was removed, diluted 50× with TISAB II buffer, and measured by fluoride ISE. The fluoride concentration was measured to be 2.45 mg/L, corresponding to 58.0% of the available fluorine.

Control Experiments

Fluoride Partitioning.

The literature method (Ware, Argentine et al. 1988) requires that the sample initially be present in diethyl ether, which is the reaction solvent. After the sodium reduction reaction, water is added and the released fluoride partitions into the aqueous phase, which is subsequently sampled and analyzed. An experiment was performed wherein an aqueous standard of fluoride was shaken with an equal volume of diethyl ether, 30 drops of methanol, five drops of methyl orange indicator, and two drops of concentrated nitric acid (simulating the other components of the reaction aside from the sodium dispersion). The phases were allowed to separate, an aliquot of the aqueous phase was diluted 50× with TISAB II buffer, and measured by fluoride ion selective electrode (ISE). The fluoride was recovered at 95%.

Acid Effects.

After determination of our optimal experimental conditions, a control experiment was performed with the purpose of understanding the importance of acidification of the aqueous phase with respect to fluoride recovery. It may be preferable to skip the acidification step for simplicity as well as to remove potential anion interference if the sample is to be analyzed by ion chromatography. A known quantity of inorganic fluoride was used in each case. When the sample was acidified as usual, the fluoride recovered in the aqueous phase was 84% of the expected value. When the acidification step was skipped, no fluoride was recovered in the aqueous phase. This result implies that acidification is necessary to move inorganic fluoride from the organic to the aqueous phase.

Organofluoride Control Blank.

Two milliliters of the 40% sodium dispersion was added to 50 mL of dry diethyl ether in a 120-mL glass beaker. Thirty drops of dry methanol was added and the solution was stirred for five minutes. As expected, gas evolution was observed. After five minutes, 50 mL of water was slowly added to the beaker with good stirring (quenching the reaction). Five drops of methyl orange indicator was added followed by a sufficient amount of concentrated nitric acid to reach the indicator endpoint (orange to pink). The solution was allowed to separate and an aliquot of the aqueous phase was removed, diluted 50× with TISAB II buffer, and measured by fluoride ISE. No fluoride was detected.

Sodium Dispersion Control Blank.

49.7 mg of PFOA was added to a 50-mL volumetric flask. Dry diethyl ether was added to the flask and the solid was observed to immediately and quantitatively dissolve. The volume was brought to 50-mL with diethyl ether. This solution was transferred to a 120-mL glass beaker. Thirty drops of dry methanol was added and the solution was stirred for five minutes. After five minutes, 50 mL of water was slowly added to the beaker with good stirring. Five drops of methyl orange indicator was added followed by a sufficient amount of concentrated nitric acid to reach the indicator endpoint (orange to pink). The solution was allowed to separate and an aliquot of the aqueous phase was removed, diluted 50× with TISAB II buffer, and measured by fluoride ISE. No fluoride was detected.

Individual Experimental Factors

Extended Time/Additional Methanol Conditions.

49.5 mg of PFOA was added to a 50-mL volumetric flask. Dry diethyl ether was added to the flask and the solid was observed to immediately and quantitatively dissolve. The volume was brought to 50-mL with diethyl ether. This solution was transferred to a 120-mL glass beaker. Two milliliters of the 40% sodium dispersion was added to the beaker. Thirty drops of dry methanol was added and the solution was stirred for five minutes. As expected, gas evolution was observed. After five minutes, 50 mL of water was slowly added to the beaker with good stirring (quenching the reaction). Five drops of methyl orange indicator was added followed by a sufficient amount of concentrated nitric acid to reach the indicator endpoint (orange to pink). The solution was allowed to separate. The volume of the aqueous phase was measured to be 60 mL. An aliquot of the aqueous phase was removed, diluted 50× with TISAB II buffer, and measured by fluoride ISE. The fluoride concentration was measured to be 2.57 mg/L. This corresponds to 22.6% of the available fluorine or about 3.4 fluorine atoms removed from a typical PFOA molecule (which has 15 fluorine atoms).

50.2 mg of PFOA was added to a 50-mL volumetric flask. Dry diethyl ether was added to the flask and the solid was observed to immediately and quantitatively dissolve. The volume was brought to 50-mL with diethyl ether. This solution was transferred to a 120-mL glass beaker. Two milliliters of the 40% sodium dispersion was added to the beaker. Thirty drops of dry methanol was added and the solution was stirred for five minutes. After five minutes, an additional 30 drops of methanol was added and the solution allowed to react an additional five minutes (10 minutes total). Another 15 drops of methanol was added, but no more gas evolution was observed and the sodium was clearly reacted. The solution was stirred an additional two minutes for a total of 12 minutes. 50 mL of water was slowly added to the beaker with good stirring (quenching the reaction). Five drops of methyl orange indicator was added followed by a sufficient amount of concentrated nitric acid to reach the indicator endpoint (orange to pink). The solution was allowed to separate. The volume of the aqueous phase was measured to be 60 mL An aliquot of the aqueous phase was removed, diluted 50× with TISAB II buffer, and measured by fluoride ISE. The fluoride concentration was measured to be 4.60 mg/L. This corresponds to 39.9% of the available fluorine or about 6.0 fluorine atoms removed from a typical PFOA molecule (which has 15 fluorine atoms) (Table 2).

TABLE 2

| Chemical | Concentration, mg/L | Reaction conditions | F concentration, mg/L | % Loss of Fluoride | No. F atoms |
|---|---|---|---|---|---|
| PFOA (15 F atoms) | 990 | 2 mL of 40% dispersed sodium, methanol, for 5 minutes | 2.57 | 22.6% | 3.4 |
| PFOA (15 F atoms) | 1004 | 2 mL of 40% dispersed sodium, methanol, for 12 minutes | 4.60 | 39.9% | 6 |

Sodium Addition.

50.0 mg of PFOA was added to a 50-mL volumetric flask. Dry diethyl ether was added to the flask and the solid was observed to immediately and quantitatively dissolve. The volume was brought to 50-mL with diethyl ether. This solution was transferred to a 120-mL glass beaker. Two milliliters of the 40% sodium dispersion was added to the beaker. Thirty drops of dry methanol was added and the solution was stirred for five minutes. An additional 1-mL of sodium dispersion was added (3-mL total) and the solution was allowed to stir an additional 5 minutes. Fifteen drops of dry methanol was added and the solution was stirred for ten minutes. An additional 1-mL of sodium dispersion was added (4-mL total) and the solution was allowed to stir an additional 5 minutes. Fifteen drops of dry methanol was added and the solution was stirred for five minutes. 50 mL of water was slowly added to the beaker with good stirring (quenching the reaction). Five drops of methyl orange indicator was added followed by a sufficient amount of concentrated nitric acid to reach the indicator endpoint (orange to pink). The solution was allowed to separate. The volume of the aqueous phase was measured to be 59 mL. An aliquot of the aqueous phase was removed, diluted 50× with TISAB II buffer, and measured by fluoride ISE. The fluoride concentration was measured to be 4.60 mg/L. This corresponds to 40.1% of the available fluorine or about 6.0 fluorine atoms removed from a typical PFOA molecule (which has 15 fluorine atoms).

Solvent System.

Experiments were performed with the objective of replacing the diethyl ether solvent system, which is relatively volatile (Table 3).

TABLE 3

| Solvent System | Fluoride Recovery |
|---|---|
| 1% ethyl acetate, 2% diethyl ether, and 97% n-heptane | 7.0% |
| 2% diethyl ether, 98% n-heptane | 9.1% |
| 50% diethyl ether, 50% n-heptane | 20.1% |
| Dibutyl ether (18° C.) | 10.9% |
| Dibutyl ether (50° C.) | 8.6% |

Alcohol Identity.

Experiments were performed varying the identity of the alcohol used in the reaction (Table 4).

TABLE 4

| Alternate Alcohol | Fluoride Recovery |
|---|---|
| Methanol | 22.6%-39.9% (varied with reaction time) |
| Isopropyl Alcohol (2-propanol) | 51.4% |
| 1-butanol | 44.9% |
| 2-butanol | 50.6% |
| Tert-butyl alcohol (2-methyl-2-propanol) | 16.3% |
| Alternating methanol, 2-propanol | 61.0% |
| Alternating 2-methyl-2-propanol, 2-propanol | 38.9% |
| Alternating 2-methyl-2-propanol, 2-butanol | 43.9% |
| Alternating methanol, 2-propanol (both alcohols dried with molecular sieve), Trial 1 | 71.2% |
| Alternating methanol, 2-propanol (both alcohols dried with molecular sieve), Trial 2 | 69.0% |
| Alternating methanol, 2-butanol (both alcohols dried with molecular sieve) | 29.3% |

A control experiment was performed with no PFAS compound but using the best set of conditions obtained from the alcohol identity experiment, i.e., alternating methanol, 2-propanol (both alcohols dried with molecular sieve). No free fluoride was detected.

Isopropyl Alcohol and Methyl Alcohol Ratio.

47.0 mg of PFOA was added to a 120-mL beaker. 50-cc of dry (mol. sieve) diethyl ether was added, and the PFOA dissolved immediately. The reaction temperature is carefully controlled at 18° C. by way of a jacketed beaker and temperature-controlled water bath. The literature boiling point of diethyl ether is approximately 35° C. Two milliliters of the 40% sodium dispersion were added to the beaker and the contents were stirred until homogenous. Added three 500-µL aliquots of dry (using molecular sieve) isopropyl alcohol and stirred for twenty minutes. A 794-µL aliquot of dry (mol. sieve) methanol was added and stirred for five minutes. Note that this is an equimolar amount of methanol with respect to IPA added. After less than five minutes the solution turned white. An additional 250-µL aliquot of isopropanol was added, but the reaction was visibly complete. The total isopropanol added was 1750 µL and total methanol was 794 µL. The contents of the beaker appeared white with no visible gray chunks. 50 mL of water was slowly added to the beaker with good stirring (quenching the reaction). Five drops of methyl orange indicator was added followed by a sufficient amount of concentrated nitric acid to reach the indicator endpoint (orange to pink). The solution was allowed to separate. The volume of the aqueous phase was measured to be 60 mL. An aliquot of the aqueous phase was removed, diluted 50× with TISAB II buffer, and measured by fluoride ISE. The fluoride concentration was measured to be 8.39 mg/L. This corresponds to 77.8% of the available fluorine.

Method Optimization: Statistically Designed Experiment

In order to better understand the factors that affect fluoride recovery, a statistically designed experiment (SDE) set was performed using Design Expert software. Factors systematically varied over three levels were:

Temperature (0° C., 15° C., 30° C.)
Time between sodium and alcohol addition (1 minute, 15.5 minutes, 30 minutes)
IPA:MeOH mol ratio (10:1, 1:1, 1:10)
The solvent system (diethyl ether), amount of PFOA (5.0-10.0 mg), and amount of water used to quench (50 mL) were held constant. Experiments were randomized, and the free fluoride recovery response was measured (Table 5):

TABLE 5

| Std | Run | Factor 1 A: Time between Sodium and Alcohol addition min | Factor 2 B: IPA:MeOH % | Factor 3 C: Temp C. | Response 1 Fluoride Recovery % |
|---|---|---|---|---|---|
| 17 | 1 | 15.5 | 50 | 15 | 78.6 |
| 3 | 2 | 1 | 91 | 15 | 79.2 |
| 15 | 3 | 15.5 | 50 | 15 | 84.3 |
| 8 | 4 | 30 | 50 | 30 | 80.5 |
| 5 | 5 | 1 | 50 | 0 | 62.3 |
| 12 | 6 | 15.5 | 91 | 30 | 87.2 |
| 14 | 7 | 15.5 | 50 | 15 | 75 |
| 4 | 8 | 30 | 91 | 15 | 80.8 |
| 9 | 9 | 15.5 | 9 | 0 | 63.5 |
| 16 | 10 | 15.5 | 50 | 15 | 59.4 |
| 11 | 11 | 15.5 | 9 | 30 | 81.5 |
| 1 | 12 | 1 | 9 | 15 | 77.2 |
| 6 | 13 | 30 | 50 | 0 | 50 |
| 10 | 14 | 15.5 | 91 | 0 | 61.3 |
| 2 | 15 | 30 | 9 | 15 | 71.9 |
| 13 | 16 | 15.5 | 50 | 15 | 77.2 |
| 7 | 17 | 1 | 50 | 30 | 85.3 |

Briefly, the factor that seemed to have the most effect was temperature, with high temperatures favored over low temperatures. Higher ratios of IPA:MeOH seemed to be favored. The time between sodium and alcohol addition had minimal effect on the response.

Figure 2:
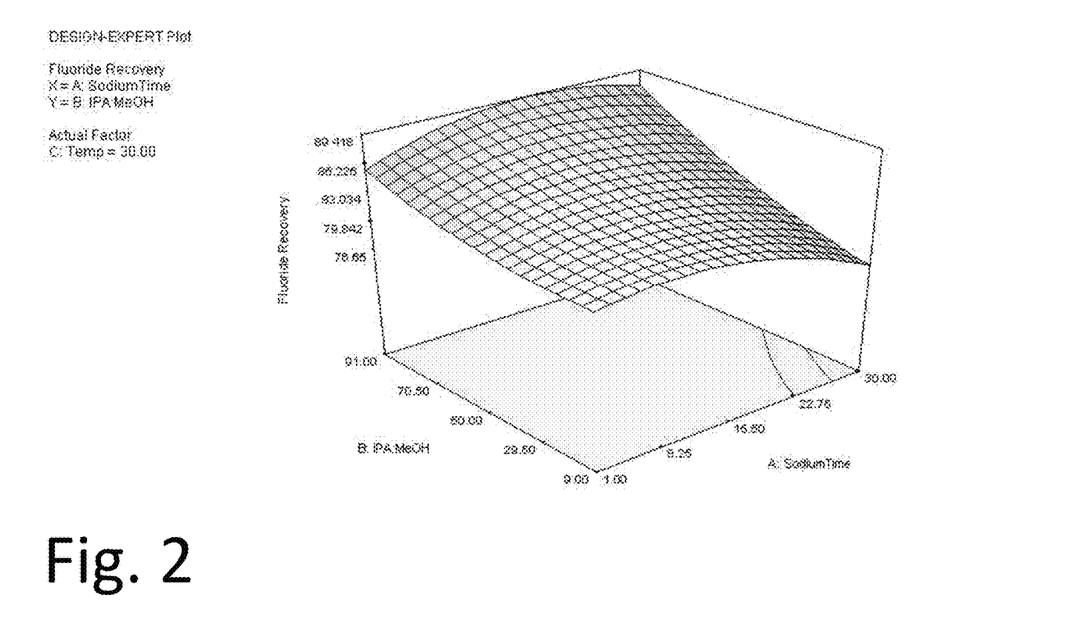
FIG. 2 shows fluoride recovery as a function of reaction time with sodium and molar ratio of 2-propanol to methanol.

A check experiment was performed wherein the temperature was 30° C., the molar ratio of IPA:MeOH was 20:1, and the time between sodium and alcohol addition was approximately 18 minutes, representing an optimal set of conditions. The fluoride recovery was 84.1% of the theoretical value (FIG. 2).

Most Preferred Experimental Conditions.

A quantity of the PFAS material (in this example, 9.7 mg of PFOA) is dissolved in dried (molecular sieve) diethyl ether and temperature controlled via jacketed beaker at 30° C. The reaction vessel is blanketed in argon. The solution is allowed to (magnetically) stir for five minutes. Two milliliters of the 40% sodium dispersion is slowly added, and the solution is allowed to stir for 18 minutes and 15 seconds. 300 microliters of dried isopropyl alcohol is added to the reaction vessel and allowed to stir for five minutes. Eight microliters (20:1 mole ratio of IPA:MeOH) of dried methanol is added and the solution is allowed to stir for five minutes. 150 microliters of dried isopropyl alcohol is added to the reaction vessel and allowed to stir for five minutes. Four microliters of dried methanol is added and the solution is allowed to stir for five minutes. The reaction is quenched with 25 milliliters of high purity (18.2 MΩ·cm) deionized water and the reaction vessel is cooled to 10° C. Three to five drops of methyl orange indicator is added to the beaker and sufficient nitric acid is added to turn the indicator pink. The magnetic stirring is stopped and the phases allowed to separate for five minutes. The volume of the aqueous phase is recorded and an aliquot of the aqueous phase is removed and diluted with TISAB II buffer. The fluoride concentration of the sample is immediately measured using the fluoride ion-selective electrode. In this example, the fluoride recovery was 82%.

Solvent System Examination.

The ideal solvent is unreactive with sodium metal, immiscible with water, and the preferential phase for PFAS while being less preferential for free fluoride than water. Diethyl ether fits these requirements for PFOA, but has a relatively low boiling point (34.6° C.). The SDE series suggested that higher temperatures are favored, so it is desirable to find a solvent that fits all of the requirements described above and has a higher boiling point than diethyl ether. Dibutyl ether (BP 141° C.) and diisopropyl ether (BP 69° C.) are candidates.

An initial experiment was performed wherein the diethyl ether solvent was allowed to boil under reflux conditions and the reaction was performed inside the reflux apparatus. This is the maximum theoretical temperature for the diethyl ether system. Fluoride recovery was 81.7% of the theoretical amount.

For a direct comparison to diethyl ether, separate reactions were performed in the dibutyl ether and diisopropyl ether solvent systems and at 30° C., the fluoride recovery was 15.5% and 18.1% of the theoretical amount, respectively. A sample of the aqueous phase of dibutyl ether was reanalyzed the next day to determine if there was a time factor involved in the partitioning. The result of the duplicate sample was 15.3%.

Comparison of Fluoride Measurements Using ISE and Ion Chromatography.

Multiple samples were submitted for ion chromatography, with the purpose of comparing the fluoride results with those obtained from the ion selective electrode (Table 6). A sample of the TISAB II buffer, each of the electrode calibration points (0.25, 0.50, 2.50, 5.00, and 10.00 mg/L F−), all of the experimental samples generated in 2019, and a sample spiked with a known amount of fluoride were measured. Each of the experimental samples generated in 2019, as well as the spiked sample described above were re-submitted for analysis, using high-purity (18.2 MΩ·cm) deionized water as the diluent. Results are below:

TABLE 6

| Sample ID | IC Result (µg/mL) | ISE Result (µg/mL) | RPD |
|---|---|---|---|
| Sample A | 8.08 | 8.00 | 1.1% |
| Sample B | 8.87 | 9.00 | 1.4% |
| Sample C | 8.30 | 7.98 | 3.9% |
| Sample D | 7.79 | 8.39 | 7.4% |

Method Detection Limits (MDL) and Method Quantitation Limits (MQL) in Aqueous and Solid Matrices.

The MDL and MQL of RTOF in both aqueous and solid matrices (Table 7).

TABLE 7

| Parameter | RTOF |
|---|---|
| $MDL_{Aq}$, ppb | 62.22 |
| Aqueous F $MQL_{Aq}$, ppb | 160 |
| Soil F $MQL_{Soil}$, ppm | 40 |

Total Organofluorine Method Demonstration in Different Matrices.

Although the method optimization was performed on PFOA, to understand the applicability of the method for a broader suite of PFAS chemicals, the optimized method was applied to measure the total organofluorine content in the PFAS mix spiked aqueous and other relevant matrices such as AFFF material. The list of 13 PFAS mix analytes spiked are shown in the Table 8. There is a huge variation in PFAS concentrations in the PFAS contaminated environmental sample compared to the AFFF concentrates. Hence, the sample preparation methods followed for these two matrices were different and detailed explanation is provided below.

PFAS Spike samples. A mix of PFAS known standards were spiked into 250 mL of milliQ water at three concentration levels (Table 8). These samples were analyzed for AOF-CIC and Battelle's RTOF method. The results show that RTOF and AOF-CIC methods show comparable performance (Table 9).

TABLE 8

| Analyte | Acronym | CAS No. |
|---|---|---|
| Perfluoro-n-butanoic acid | PFBA | 375-22-4 |
| Perfluorohexanoic acid | PFHxA | 307-24-4 |
| Perfluoroheptanoic acid | PFHpA | 374-85-9 |
| Perfluorooctanoic acid | PFOA | 335-67-1 |
| Perfluorononanoic acid | PFNA | 375-95-1 |
| Perfluorodecanoic acid | PFDA | 335-76-2 |
| Perfluoroundecanoic acid | PFUnA | 2058-94-8 |
| Perfluorododecanoic acid | PFDoA | 307-55-1 |
| Perflurorbutanesulfonic acid | PFBS | 375-73-5 |
| perfluoro-1-hexanesulfonate | PFHxS | 3781-99-6 |
| Perfluorooctane sulfonic acid | PFOS | 1763-23-1 |
| 1H,1H,2H,2H-Perfluorooctane sulfonate | 6:2FTS | 27619-97-2 |
| 1H,1H,2H,2H-Perfluorodecane sulfonate | 8:2FTS | 39108-34-4 |

TABLE 9

| Spiked F | % Recovery | |
|---|---|---|
| Concentration, ppb | Reductive RTOF | AOF (C-IC) |
| 1333 | 74% | 71% |
| 1333 | 74% | 70% |
| 133 | 73% | 68% |
| 133 | 73% | 69% |
| 13 | <MQL | 89% |
| 13 | <MQL | 90% |

Aqueous Matrices. The concentration of PFAS present in aqueous samples range from parts per trillion to low parts per million, and hence these matrices need to be concentrated to measure the fluoride content in these matrices. In addition, as the reaction needs to be performed under anhydrous conditions, and the need to improve the quantitation limits of the fluoride measurements, the aqueous samples containing a mix of 13 PFAS analytes were concentrated by following the solid phase extraction using the weak anion exchange (WAX) cartridges. Following the extraction, the cartridges are dried using vacuum for 15-20 min and the PFAS compounds are eluted from the solid phase cartridges with a small amount of methanol. The extract is concentrated to dryness with nitrogen in a heated water bath, reconstituted with dry diethyl ether and sonicated for 10 minutes and the above optimized RTOF protocol was followed and fluoride measurements were made using the ISE. The results show 74% of fluoride recovered from samples spiked with known amounts of 13 different PFAS chemicals over a range of total F concentrations, demonstrates the applicability of the RTOF methods for wide range of PFAS chemicals.

Solid Matrices: The PFAS present in solid matrices such as soils and sediments needs to be extracted to measure the fluoride content in these matrices. Approximately, 2.5 g of solid sample is extracted twice using 0.4% NH4OH in methanol followed by clean up of the combined extract using EnviCarb cartridges. The eluate from the cartridge is further concentrated to dryness with nitrogen in a heated water bath, reconstituted with dry diethyl ether and sonicated for 10 minutes and the above optimized RTOF protocol was followed and fluoride measurements were made using the ISE. The results show greater than 60% of fluoride recovered from samples spiked with known amounts of 13 different PFAS chemicals over a range of total F concentrations, demonstrates the applicability of the RTOF methods for wide range of PFAS chemicals in soil matrices (Table 10).

TABLE 10

| Samples | PFAS Total F Concentration, mg/Kg soil | % Recovery |
|---|---|---|
| Spike Level 1 | 36 | <MQL |
| Spike Level 2 | 89 | 66 ± 12 |
| Spike Level 3 | 143 | 62 ± 9 |

Figure 3:
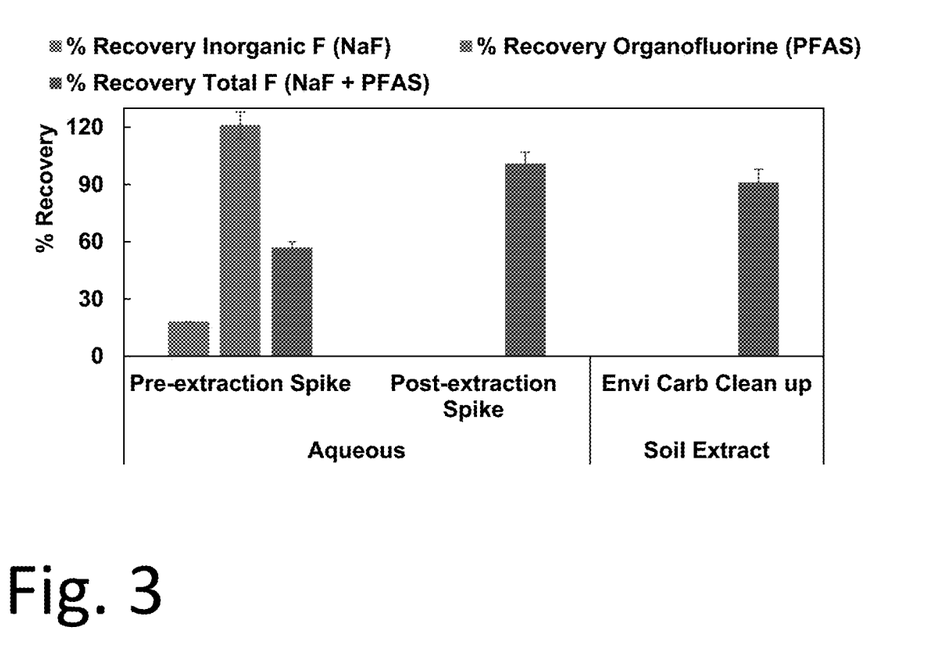
FIG. 3 illustrates the removal of inorganic fluoride during the sample preparation process and accounting for only extractable organofluorine after extraction.

Washing off the Inorganic Fluoride during the Sample preparation: To make sure the Fluoride measured in the sample is organic fluoride generated from the defluorination of organic fluorinated compounds, in this case PFAS-impacted environmental matrices. All the aqueous samples were extracted following the SPE method and inorganic fluoride measurements are made on the extracts using the ISE measurements. For the measurement of extractable organic fluoride measurement, the extract is concentrated to dryness with nitrogen in a heated water bath, reconstituted with dry diethyl ether and sonicated for 10 minutes and the above RTOF protocol was followed, and fluoride measurements were made using the ISE. The difference between the Fluoride measurement after and before RTOF procedure, results in the contribution of fluoride from organic fluorinated compounds. Another method to remove the inorganic fluoride is to rinse the Envicarb with sodium nitrate solution as reported in the literature. However, the WAX extraction procedure washes off the inorganic fluoride and leaves only organic fluoride on SPE cartridge, which is eluted followed by concentration and RTOF measurement (FIG. 3). The sodium Fluoride spike representing the inorganic fluoride, and a mix of PFAS spike represents the oranofluorine. A spike with a mix of NAF and the PFAS represents the total fluorine, which a mix of both the inorganic and organofluorine. The pre-extraction spike recovery of 18±0% of NaF (inorganic fluoride) represents that most of the inorganic F is washed off during the SPE extraction process. The pre-extraction spike recovery of 121±7% of PFAS (organic fluoride) represents that most of the PFAS (organic F) was extracted on to the WAX cartridge during the SPE extraction process. Further the pre-extraction spike recovery of total F (mix of PFAS and NaF) was 57±3% representing that most of the inorganic F is washed off during the SPE extraction process and organic F (PFAS) remained on the cartridge (FIG. 3). In addition, the post-extraction spike recovery of total F was 101±6% indicating good defluorination of PFAS and accounting for the inorganic F present in the sample.

Soil extracts are cleaned-up using the Envi Carb clean up. The total F spike recovery of the Envi Carb pre-clean up showed 91±7% indicating that the Envi Carb clean up did not remove either inorganic F nor PFAS (FIG. 3). Another method to remove the inorganic fluoride is to rinse the Envicarb with sodium nitrate solution as reported in the literature. Hence to report the extractable RTOF, the Fluoride measurement before and after RTOF procedure was performed and difference of the measurement was calculated as the extractable RTOF in the sample.

Figure 4:
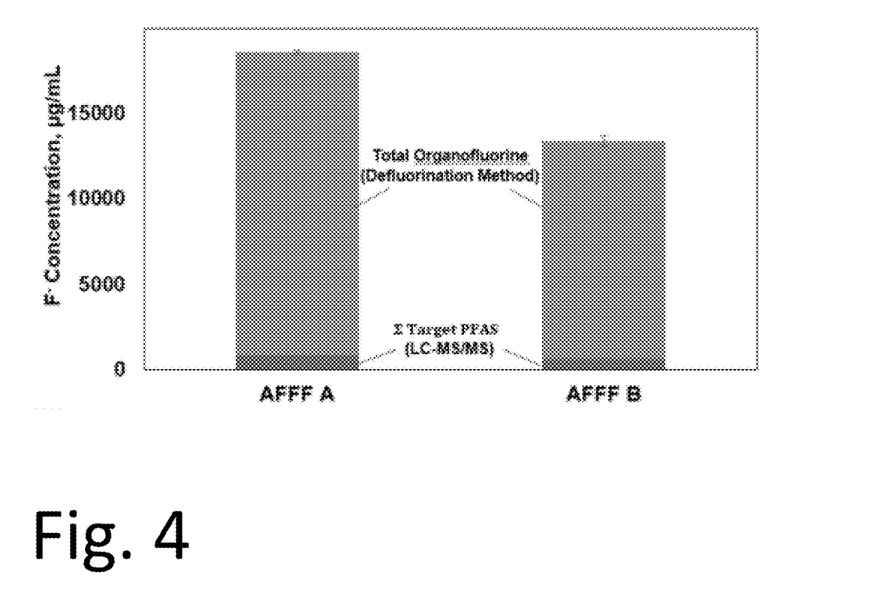
FIG. 4 shows fluorine concentrations as measured by LC-MS/MS analysis and the rest of the PFAS (>95%) which is present as unknown PFAS, which can be measured using the inventive Total Organofluorine method.

AFFF formulations. AFFF formulations are very complex matrices, in addition to PFAS, many other film forming non-fluorinated surfactants, polymers, polysaccharides, glycols, butyl methyl ethers, etc. may be present. The AFFF formulation was used as received. Approximately one ml of the concentrate was evaporated to dryness under Argon, followed by reconstitution with dry diethyl ether and sonicated for 10 minutes and the above optimized RTOF protocol was followed and fluoride measurements were made using the ISE. For AFFF samples, which have complex formulations, to supply the sufficient amount of sodium, excess sodium dispersion is added until the foaming stops, and then an additional 2 mL of sodium dispersion is added and followed the RTOF procedure. The results were compared with the known PFAS (24 analytes) measured using LC-MS/MS analysis. The results shows that only 1%-<5% of the PFAS is accounted by measuring the 24 known PFAS analytes using LC-MS/MS analysis and the rest of the PFAS (>95%) which is present as unknown PFAS, which can be measured using the Total Organofluorine method (FIG. 4 and Table 11).

TABLE 11

| Samples | F⁻ based on LC-MS/MS, µg/mL | F⁻ Measured, µg/mL |
|---|---|---|
| AFFF A | 840 | 17,772 ± 108 |
| AFFF B | 613 | 12,797 ± 283 |
| AFFF C | 30 | 3,543 ± 458 |
| AFFF D | 1.75 | 1935 |
| AFFF E | 1.22 | 1850 |

Demonstration of RTOF Method on Different Environmental Samples and Comparison of RTOF Method and AOF-CIC Method.

The PFAS impacted samples were collected from different sources of contamination such as wastewater treatment plant (WWTP) effluent, landfill leachate, AFFF-impacted groundwater (GW) and the laboratory control PFAS spike at total F concentration of 814 ng/mL. A MilliQ water method blank was used as a negative control. The total organofluorine concentrations quantified in these complex matrices using RTOF method and AOF-CIC method are compared. The recovery of the spike sample using RTOF method was 111% and the AOF/CIC method was ~144% indicating some overestimation of AOF/CIC results (Table 12). Similar results were reported in AFFF-impacted GW with RTOF at 183 ng/mL and AOF/CIC showed higher total organic F at 341 ng/mL. The total organofluoride content in WWTP effluent was below the method quantitation limit using both the methods, whereas in landfill leachate the AOF/CIC method showed 8.3 ng/mL of organic fluoride.

TABLE 12

| Sample ID | RTOF (ng/mL) | AOF/CIC (ng/mL) |
|---|---|---|
| Method Blank | <MQL (160) | <MDL (0.4) |
| Sample Spike (814 µg/L) | 901 | 1169 |
| WWTP Effluent | <MQL | <MDL |
| Landfill Leachate | <MQL | 8.30 |
| AFFF-impacted GW | 183 | 341 |

REFERENCES

Houtz, E. F., & Sedlak, D. L. (2012). Oxidative conversion as a means of detecting precursors to perfluoroalkyl acids in urban runoff. *Environ Sci Technol,* 46(17), 9342-9349. https://doi.org/10.1021/es302274g Kissa, E. (2001). Fluorinated Surfactants and Repellents, 2nd ed.; Marcel Dekker, Inc: New York.

Miyake, Y., Yamashita, N., So, M. K., Rostkowski, P., Taniyasu, S., Lam, P. K., & Kannan, K. (2007). Trace analysis of total fluorine in human blood using combustion ion chromatography for fluorine: a mass balance approach for the determination of known and unknown organofluorine compounds. *J Chromatogr A,* 1154. https://doi.org/10.1016/j.chroma.2007.03.084

Peaslee, G. F., Wilkinson, J. T., McGuinness, S. R., Tighe, M., Caterisano, N., Lee, S., Gonzales, A., Roddy, M., Mills, S., & Mitchell, K. (2020). Another Pathway for Firefighter Exposure to Per- and Polyfluoroalkyl Substances: Firefighter Textiles. *Environmental Science & Technology Letters.* https://doi.org/10.1021/acs.estlett/0c00410

Ritter, E. E., Dickinson, M. E., Harron, J. P., Lunderberg, D. M., DeYoung, P. A., Robel, A. E., Field, J. A., & Peaslee, G. F. (2017). PIGE as a screening tool for Per- and polyfluorinated substances in papers and textiles. *Nuclear Instruments and Methods in Physics Research Section B: Beam Interactions with Materials and Atoms,* 407, 47-54. https://doi.org/https://doi.org/10.1016/j.nimb.2017.05.052

Ross, Ian, Jeffrey McDonough, Jonathan Miles, Peter Storch, Parvathy Thelakkat Kochunarayanan, Erica Kalve, Jake Hurst, Soumitri S. Dasgupta, and Jeff Burdick. 2018. A review of emerging technologies for remediation of PFASs, *Remediation Journal,* 28: 101-26.

Schaider, L. A., Balan, S. A., Blum, A., Andrews, D. Q., Strynar, M. J., Dickinson, M. E., Lunderberg, D. M., Lang, J. R., & Peaslee, G. F. (2017). Fluorinated Compounds in U.S. Fast Food Packaging. *Environmental Science & Technology Letters.* https://doi.org/10.1021/acs.estlett.6b00435

Venkateswarlu, P. (1982). Sodium Biphenyl Method for Determination of Covalently Bound Fluorine in Organic Compounds and Biological Materials. Anal. Chem. 1982, 54, 1132-1137.

Wagner, A., Raue, B., Brauch, H.-J., Worch, E., & Lange, F. T. (2013). Determination of adsorbable organic fluorine from aqueous environmental samples by adsorption to polystyrene-divinylbenzene based activated carbon and combustion ion chromatography. *Journal of Chromatography A,* 1295, 82-89. https://doi.org/https://doi.org/10.1013/j.chroma.2013.04.051

Ware, M. L., Argentine, M. D., & Rice, G. W. (1988). Potentiometric Determination of Halogen Content in Organic Compounds Using Dispersed Sodium Reduction. *Anal. Chem.* (Washington, D.C., U.S.), 60, 383-384.

Yeung, L. W., Miyake, Y., Taniyasu, S., Wang, Y., Yu, H., So, M. K., Jiang, G., Wu, Y., Li, J., & Giesy, J. P. (2008). Perfluorinated compounds and total and extractable organic fluorine in human blood samples from China. *Environ. Sci. Technol,* 42. https://doi.org/10.1021/es800631n

What is claimed:

1. A method of determining total organofluorine in a sample comprising PFAS, comprising:
    providing a solution of PFAS in an organic solvent;
    treating the solution of PFAS with sodium metal and alcohol to obtain sodium fluoride; and
    quantifying the amount of the fluoride.

2. The method of claim 1 wherein the organic solvent comprises at least 50 mass % ether.

3. The method of claim 1 wherein the organic solvent comprises at least 50 mass % diethyl ether.

4. The method of claim 1 wherein the sodium metal is in the form of a sodium dispersion.

5. The method of claim 1 wherein the step of quantifying is conducted using an ion selective electrode.

6. The method of claim 4 wherein the extracted PFAS is contacted with the sodium dispersion for a time between 8 and 25 minutes.

7. The method of claim 4 wherein the extracted PFAS is contacted with the sodium dispersion at a temperature of at least 25° C. or at least 30° C., or in the range of 30 to 36° C.

8. The method of claim 4 wherein the extracted PFAS is contacted with the sodium dispersion prior to treating with an alcohol and wherein the alcohol comprises ethanol or a higher alcohol.

9. The method of claim 8 wherein the alcohol comprises propanol and/or butanol.

10. The method of claim 8 wherein the alcohol comprises 2-propanol and/or 2-butanol.

11. The method of claim 8 wherein the alcohol comprises 2-propanol.

12. The method of claim 11 wherein the alcohol comprises at least 50 mass % 2-propanol.

13. The method of claim 4 wherein the fluoride recovery from the organofluorine in the sample is at least 50%.

14. The method of claim 4 comprising alternating treatments with methanol and a higher alcohol.

15. The method of claim 8 comprising treatment with a mixture of methanol and 2-propanol, wherein the molar ratio of 2-propanol/methanol is at least 0.3, or at least 0.4, or at least 0.5, or in the range of 0.3 to 0.7.

16. The method of claim 4 wherein the step of contacting with sodium is conducted for a time between 1 and 20 minutes, or between 1 and 15 minutes, or between 3 and 15 minutes.

17. The method of claim 1 wherein the step of quantifying is conducted using an ion chromatography.

18. The method of claim 1 wherein the PFAS is AFFF and wherein the method comprises adding sufficient sodium until foaming stops, and then adding additional sodium.

19. The method of claim 1 wherein the PFAS is AFFF, wherein the AFFF is evaporated to dryness prior to the step of extracting, and wherein the step of extracting comprises dissolving the dried AFFF in the organic solvent.

20. The method of claim 1 wherein the solution of PFAS in an organic solvent is obtained by extracting a sample with an organic solvent.

* * * * *